April 28, 1936.  M. F. JACOBS  2,038,937

MOLDING BLANKET

Filed Oct. 25, 1934

MICHAEL F JACOBS
INVENTOR

BY F. E. Shannon
ATTORNEY

Patented Apr. 28, 1936

2,038,937

UNITED STATES PATENT OFFICE 2,038,937

MOLDING BLANKET

Michael F. Jacobs, Akron, Ohio

Application October 25, 1934, Serial No. 749,915

6 Claims. (Cl. 154—54.5)

This invention relates to molding blankets and while adapted for use in forming a matrix of any irregular surface, it is particularly intended for use in forming a matrix of a newspaper page form in which connection it will be illustrated in the drawing and hereinafter described.

Objects of the invention are to provide a molding blanket of simple, inexpensive construction and which will be extremely effective in forming a matrix having a clear impression.

Other objects are to provide an elastic molding blanket which will be soft and yielding and which will possess the property of extensibility both longitudinally and laterally and which is provided with means to limit the extensibility laterally and to limit to a greater extent its longitudinal extensibility and to thereby provide a blanket which will expand under pressure to force the matrix mat entirely around the type and form a clear distinct impression on the matrix, and further, to thus provide a matrix blanket which will not creep or buckle when fed longitudinally through the press rolls.

An additional object is to provide a molding blanket composed of a sheet of rubber having a layer of knit fabric arranged with the row of chain stitches running longitudinally of the blanket and to provide a soft, elastic coating which will hold the separate loops and strands of the fabric layer in place whereby the threads may be broken in many places without materially interfering with the utility and effectiveness of the blanket.

The above objects are accomplished and additional ends are attained by the novel construction, combination and arrangement of parts hereinafter described and illustrated in the accompanying drawing, wherein there is shown a preferred form of the invention, it being understood that the invention is capable of various adaptations and that changes and modifications may be made or resort had to substitutions which come within the scope of the claims hereunto appended.

In the drawing like characters of reference are employed to designate like parts as the same may be shown in any of the several views and in which:—

Figure 1:
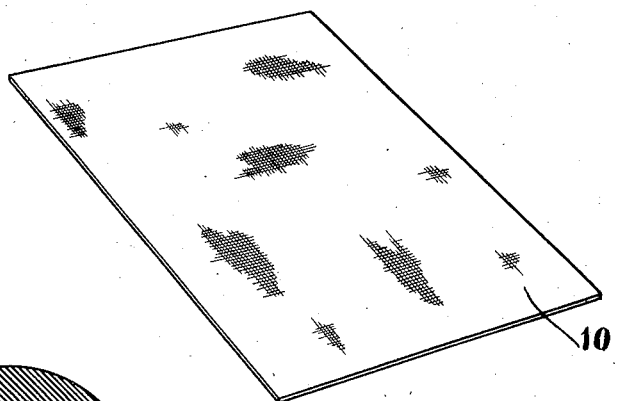
Figure 1 is a perspective view of a molding blanket constructed in accordance with this invention.
Figure 2:
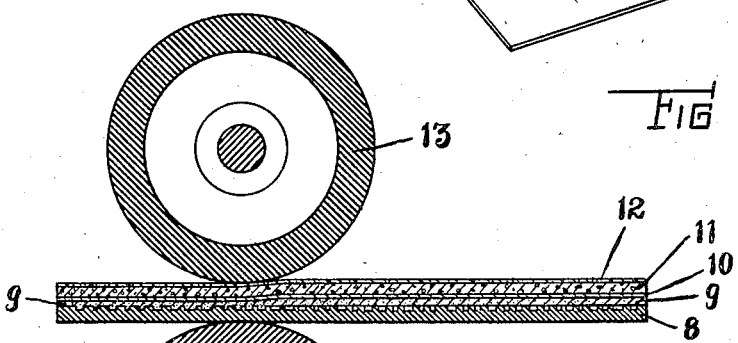
Figure 2 is a vertical, sectional view somewhat diagrammatic in form, illustrating the manner of using the molding blanket herein described.
Figure 3:
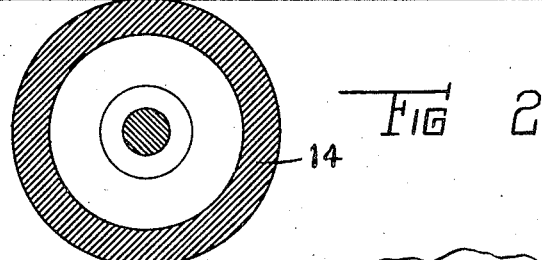
Figure 3 is an enlarged cross sectional view of a portion of a molding blanket constructed in accordance with this invention.
Figure 4:
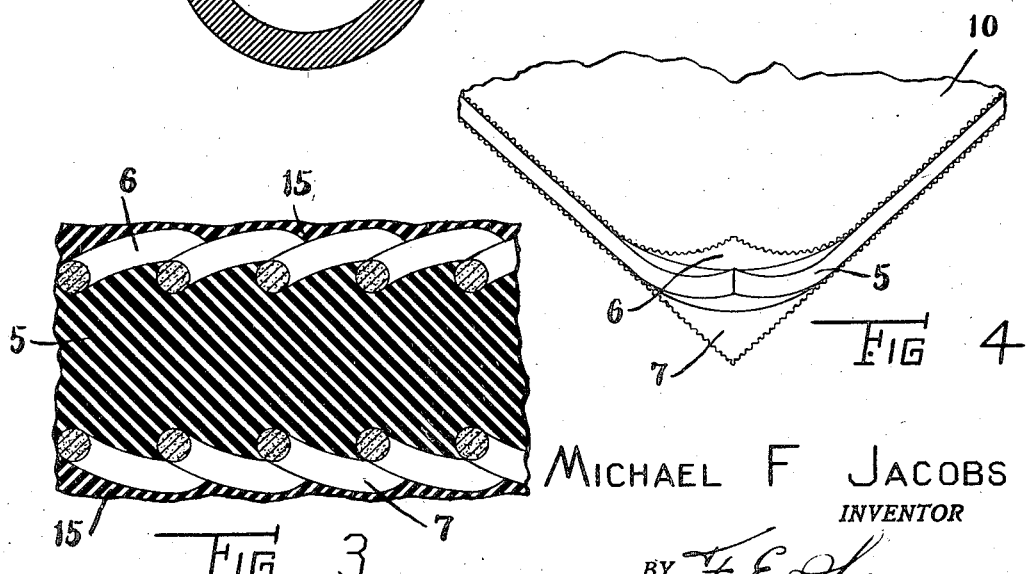
Figure 4 is a perspective view showing a corner portion of a blanket constructed in accordance with this invention, the layers of knit fabric turned back at the extreme corner of the blanket to more clearly illustrate the invention.

Proceeding now to a detailed description of the invention with reference to the particular adaptation thereof disclosed in the drawing, the numeral 5 is used to denote a layer of rubber, rubber composition or like material which forms the middle layer of the blanket herein described. The numerals 6 and 7 denote layers of knit fabric preferably knit with a stitch forming parallel loop chains disposed longitudinally thereof to provide a strong fabric capable of limited extension both longitudinally and laterally, but being materially less extensible longitudinally than laterally.

The layers of knit fabric 6 and 7 are vulcanized to the layer 5 with the rows of loops running longitudinally thereof.

In forming the molding blanket herein described, the layer of rubber 5 is first submitted to heat and calendered to form a hot plastic sheet. The layers 6 and 7 of fabric are placed thereon and a heavy pressure is applied while the sheet 5 is still hot. The knit fabric is then pressed firmly against the blanket and the inner portion of each loop of the fabric is embedded in the rubber and the layers 6 and 7 are adhesively attached thereto. A thin coating 15 of liquid rubber, preferably liquid latex is then applied to the layers 6 and 7. This latex penetrates the crevices of the fabric 6 and 7 and forms a coating over each individual loop and strand of the fabric. The layer of latex 15 joins with the layers 5 and materially assists in firmly holding the layers 6 and 7 in place thereon. The blanket thus formed is then submitted to a vulcanizing heat for a sufficient time to secure the required degree of vulcanization.

In use, the matrix mat 9 is placed on a page form 8. The molding blanket 10 herein described is then placed over the matrix mat 9. A relatively thick cushion 11 preferably formed of cork is placed on the molding blanket 10 and a layer of relatively stiff card board or other relatively stiff material 12 is placed on the cork cushion 11. The numerals 13 and 14 denote press rolls which are of ordinary construction and which are illustrated to indicate a means for pressing the matrix mat 9 firmly against the face of the page form 8. As the page form is moved longitudinally between the rolls 13 and 14, the matrix mat 9 is pressed firmly in the type of the page form 8. As the improved mat 10 herein described is formed of elastic material, it will press the mat 9 into the type crevices of the form 8 forming an exceedingly clear sharp impression of same. As the blanket 10 is run through the rolls 13 and 14, the blanket will stretch longitudinally to a very limited extent thereby forming a blanket which will not buckle or creep and which will be very effective in holding the matrix mat 9 in place during the molding operation.

Having thus illustrated my invention and described the same in detail, what I claim as new and desire to secure by Letters Patent is:—

1. A molding blanket for the purpose described comprising a layer of elastic rubber and two layers of knit fabric, said layers arranged in superimposed relation with the layer of rubber positioned between the knit fabric layers.

2. A molding blanket for the purpose set forth comprising a layer of elastic rubber and two layers of knit fabric, said layers arranged in superimposed relation with a layer of the knit fabric on each side of the layer of rubber, said knit fabric layers joined to the rubber layer by vulcanization.

3. A molding blanket for the purpose set forth comprising superimposed layers of rubber and knit fabrics intimately joined by vulcanization.

4. A molding blanket comprising a layer of elastic rubber having a layer of knit fabric covering each side thereof and a relatively thin layer of rubber coating the outer face of each layer of knit fabric.

5. A molding blanket comprising a main layer of elastic rubber, a layer of knit fabric covering each side thereof and joined thereto by vulcanization, a thin layer of rubber covering the outer face of the knit fabric, said thin layers of rubber permeating the fabric and joined to said main layer by vulcanization.

6. In a molding blanket, superimposed layers of knit fabric and rubber, said layers of fabric being knit to provide a limited extensibility longitudinally and a greater extensibility laterally, said fabric positioned in said blanket with the lines of least extensibility disposed longitudinally of the blanket substantially as and for the purpose herein set forth.

MICHAEL F. JACOBS.